(12) United States Patent
Sood

(10) Patent No.: US 7,911,997 B2
(45) Date of Patent: Mar. 22, 2011

(54) QUALITY OF SERVICE RESOURCE NEGOTIATION

(75) Inventor: Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1046 days.

(21) Appl. No.: 11/462,657

(22) Filed: Aug. 4, 2006

(65) Prior Publication Data

US 2008/0031204 A1 Feb. 7, 2008

Related U.S. Application Data

(60) Provisional application No. 60/799,092, filed on May 10, 2006.

(51) Int. Cl.
*H04W 4/00* (2009.01)
*H04W 72/00* (2009.01)

(52) U.S. Cl. ........ 370/328; 370/329; 370/338; 455/450; 455/452.2

(58) Field of Classification Search .................. 370/328, 370/329, 338; 455/452.2, 453, 455
See application file for complete search history.

(56) References Cited

U.S. PATENT DOCUMENTS

| 6,490,256 | B1 | 12/2002 | Jones et al. |
| 6,594,268 | B1 | 7/2003 | Aukia et al. |
| 6,947,399 | B1 * | 9/2005 | Sen et al. ........................ 370/331 |
| 6,970,423 | B2 * | 11/2005 | Chuah .......................... 370/230 |
| 7,031,266 | B1 | 4/2006 | Patel et al. |
| 7,133,376 | B2 * | 11/2006 | Olson ........................... 370/320 |
| 7,426,394 | B2 * | 9/2008 | Rinne ......................... 455/452.1 |
| 2003/0125028 | A1 * | 7/2003 | Reynolds ....................... 455/437 |
| 2004/0242235 | A1 * | 12/2004 | Witana ....................... 455/452.2 |
| 2005/0141452 | A1 * | 6/2005 | Vancraeynest ................ 370/329 |
| 2006/0068821 | A1 * | 3/2006 | Rinne ........................... 455/515 |
| 2006/0083193 | A1 * | 4/2006 | Womack et al. .............. 370/328 |
| 2008/0039090 | A1 * | 2/2008 | Jin et al. ........................ 455/436 |

OTHER PUBLICATIONS

U.S. Appl. No. 11/382,814, filed May 1, 2006, Walker et al.
P802.11r™/D4.0, Draft Amendment to Standard for Information Technology—Telecommunications and Information Exchange Between Systems—Local and Metropolitan Area Networks—Specific Requirements—Par 11: Wireless LAN Medium Access Control (MAC) and Physical Layer (PHY) Specifications: Amendment 2: Fast BSS Transition, IEEE 802 Committee of the IEEE Computer Society, Nov. 2006, pp. i-110.
International Search Report mailed on Nov. 7, 2007 for International Application No. PCT/US2007/068476, 5 pgs.
IEEE Computer Society, "Part 11: Wireless LAN Medium Access Control (MAC) and Physical Layer (PHY) specifications, Amendment 8: Medium Access Control (MAC) Quality of Service Enhancements," IEEE Standard for Information Technology—Telecommunications and information exchange between systems, IEEE Std 802. 11e, Nov. 11, 2005, New York, NY.

* cited by examiner

*Primary Examiner* — Kamran Afshar
*Assistant Examiner* — Kathy Wang-Hurst
(74) *Attorney, Agent, or Firm* — Schwabe, Williamson & Wyatt, P.C.

(57) ABSTRACT

Embodiments of apparatuses, articles, methods, and systems for negotiating quality of service resources in wireless networks are generally described herein. Other embodiments may be described and claimed.

19 Claims, 5 Drawing Sheets

QUALITY OF SERVICE RESOURCE NEGOTIATION

RELATED APPLICATION

The present application claims priority to U.S. Provisional Patent Application No. 60/799,092, filed May 10, 2006, entitled "A System, Apparatus, Methods and Associated Protocols for Service Resource Negotiation in a Wireless Communications Network," the entire contents of which are hereby incorporated by reference.

FIELD

Embodiments of the present invention relate generally to the field of wireless networks, and more particularly to negotiating for quality of service resources in said wireless networks.

BACKGROUND

A communication session in a wireless network typically involves a local station communicating with a remote station via a communication link. The communication link may include a wireless connection between the local station and a wireless router. For various reasons, the quality of the wireless connection between the wireless router and the local station may deteriorate. This may be due to overloading of the wireless router, mobility of the station, interference, etc. In order to preserve the established communication link, the local station may re-associate the wireless connection portion of the communication link with another wireless router. When the communication session involves delay intolerant transmissions, e.g., voice or video, various quality of resource (QoS) challenges are presented for a successful and efficient re-association of the wireless connection.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
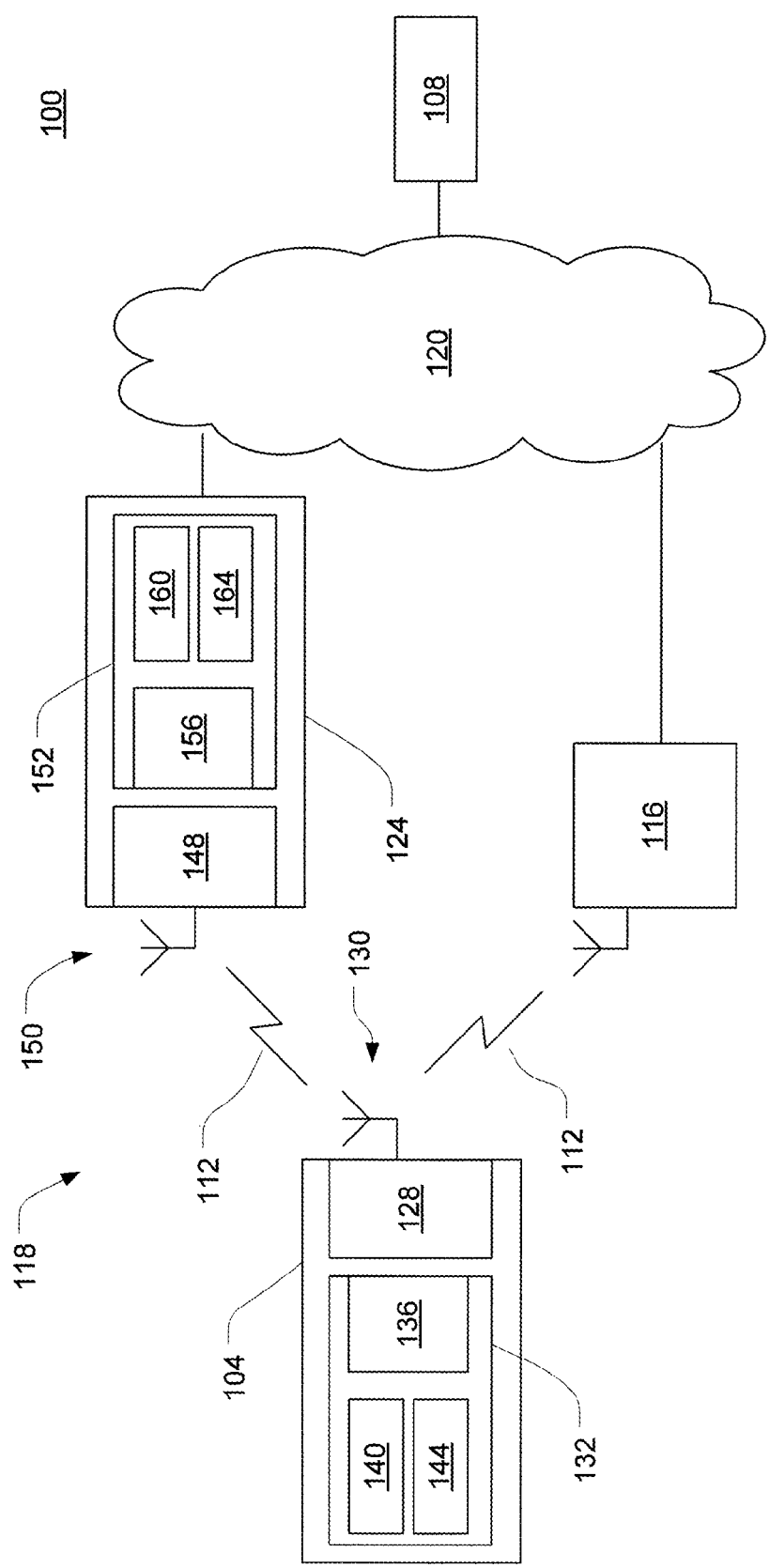
FIG. 1 illustrates a network providing for fast transitioning in accordance with an embodiment of this invention.

Embodiments of the present invention may provide a method, article of manufacture, apparatus, and system for negotiating quality of service (QoS) resources in wireless networks.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrase "A/B" means "A or B." The phrase "A and/or B" means "(A), (B), or (A and B)." The phrase "A, B, and/or C" means "(A), (B), (C), (A and B), (A and C), (B and C) or (A, B and C)."

A software component, as used herein, may refer to programming logic employed to obtain a desired outcome. The term "software component" may be synonymous with "module" or "agent" and may refer to programming logic that may be embodied in hardware or firmware, or in a collection of software instructions, possibly having entry and exit points, written in a programming language, such as, for example, C++. A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. In some embodiments, the components described herein are implemented as software modules, but nonetheless may be represented in hardware or firmware.

It will be further appreciated that hardware components may be comprised of connected logic units, such as gates and flip-flops, and/or may be comprised of programmable units, such as programmable gate arrays or processors. Although only a given number of discrete software/hardware components may be illustrated and/or described, such components may nonetheless be represented by additional components or fewer components without departing from the spirit and scope of embodiments of the invention.

FIG. 1 illustrates a network 100 supporting fast transitioning (FT) of mobile wireless devices with QoS resource negotiation in accordance with an embodiment of this invention. In this embodiment, a station 104 may be communicating with a remote network entity 108 via an established communication link. In various embodiments, the communication session between the station 104 and the remote network entity 108 may include delay and/or jitter sensitive network traffic such as, but not limited to, streaming multimedia, Internet protocol (IP) telephony (e.g., voice-over IP (VoIP)), video teleconferencing, etc.

The communication link may include a wireless connection 112 between the station 104 and, at least initially, a wireless router 116. The station 104 and wireless router 116 may be entities of a wireless network 118 such as, but not limited to, a wireless local area network (WLAN), a wireless metropolitan access network (WMAN), etc. The wireless network 118 may be a subset of network 100. In an embodiment, the wireless network 118 may be an infrastructure network and the wireless router 116 (and other wireless routers) may be access points. In another embodiment, the wireless network 118 may be an ad hoc network and the wireless router 116 (and other wireless routers) may be stations.

In an embodiment, the wireless network 118 may comply with one or more of the Institute of Electrical and Electronics Engineers (IEEE) wireless LAN/WLAN standards, e.g., any of the 802.11 standards.

The wireless router 116 may be communicatively coupled to other network devices 120 to relay communications between the station 104 and the remote network entity 108. The remote network entity 108 may be communicatively coupled to the other network devices 120 through a wireless connection or a wired connection.

In an embodiment, the station 104 may experience/anticipate deterioration in a quality of the wireless connection 112 with the wireless router 116. In this embodiment, the station 104 may initiate a fast transitioning procedure in order to re-associate the wireless connection 112 with another wireless router, e.g., target wireless router 124. "Fast transitioning" may also be referred to as "fast roaming."

Network entities capable of performing fast transitioning procedures as described herein, e.g., station 104 and wireless router 124, may be generically referred to as FT platforms. In some embodiments FT platforms may be mobile network client devices such as, but not limited to, a personal computing device, a laptop computing device, a phone, etc. or network infrastructure devices, e.g., a server, an access point, etc.

The station 104 and the wireless router 124 may include various hardware and/or software components directed toward fast transitioning operations in accordance with embodiments of this invention. Some of these components will now be briefly introduced and discussed further in embodiments to follow.

The station 104 may include a wireless network interface card (WNIC) 128 to facilitate wireless communication with other components of the wireless network 118. The WNIC 128 may include firmware to facilitate processing of messages to and/or from components of a host 132. The WNIC 128 may cooperate with an antenna structure 130 to provide access to other entities of the wireless network 118.

In various embodiments, the antenna structure 130 may include one or more directional antennas, which radiate or receive primarily in one direction (e.g., for 120 degrees), cooperatively coupled to one another to provide substantially omnidirectional coverage; or one or more omnidirectional antennas, which radiate or receive equally well in all directions.

In various embodiments, the host 132 may include a driver, e.g., wireless local area network (WLAN) driver 136, to drive the WNIC 128 for other components of the host 132 such as a transitioning manager 140 and a supplicant 144. The transitioning manager 140 may control QoS operations such as the resource negotiations discussed in embodiments of this invention. The supplicant 144 may act as a security software component, e.g., for performing message integrity calculations.

The wireless router 124 may include a WNIC 148 and antenna structure 150 to facilitate wireless communication with a number of stations in the wireless network 118. The wireless router 124 may include a host 152 having a driver 156 to drive the WNIC 148 for other components of the host 152 such as a QoS scheduler 160 and an authenticator 164. The QoS scheduler 160 may process and manage resource requests for a number of different stations of the wireless network 118. The authenticator 164 may act as a security software component, e.g., for performing message integrity calculations.

Figure 2:
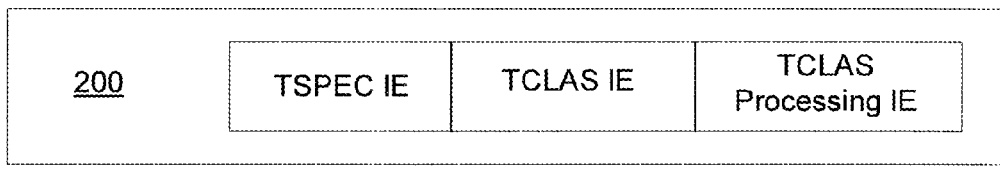
FIG. 2 illustrates quality of service resource in accordance with an embodiment of this invention.

During a re-association procedure, the transitioning manager 140 of the station 104 may generate and transmit, via the WLAN driver 136 and the WNIC 128, a resource request to the target wireless router 124 requesting a resource to maintain a QoS level for transmissions within the session. FIG. 2 illustrates an example of a QoS resource 200 in accordance with an embodiment of this invention. In this embodiment, the QoS resource 200 includes a traffic specification information element (TSPEC IE) to describe the traffic pattern for which service is being requested including, e.g., data rate, packet size, delay, and service interval; a traffic classification (TCLAS) IE to specify certain parameters to identify a packet as belonging to the communication session; and a TCLAS processing IE to provide information on processing of packets. These information elements may be similar to like-name elements described in IEEE 802.11 (e) (published Nov. 11, 2005), along with any updates, revisions, and/or amendments to such.

The QoS scheduler 160 of the wireless router 124 may process the resource request and determine whether it can allocate one of the requested resources to the station 104. In the event that the wireless router 124 is unable to allocate any of the requested resources, it may communicate this nonallocation to the station 104. In various embodiments of this invention, a nonallocation of a requested resource may not cause a fast transitioning procedure to fail. That is, the station 104 may still have the option to re-associate the wireless connection 112 with the wireless router 124 even if it will be at a level of service less than that which was requested. This flexibility may allow for the transitioning manager 140 to decide to continue transference of the wireless connection 112 or to start a new negotiation, depending on the needs of the station 104 at that time. This elasticity may facilitate preservation of the established communication link, even if it is done so at a decreased level of service.

Figure 3:
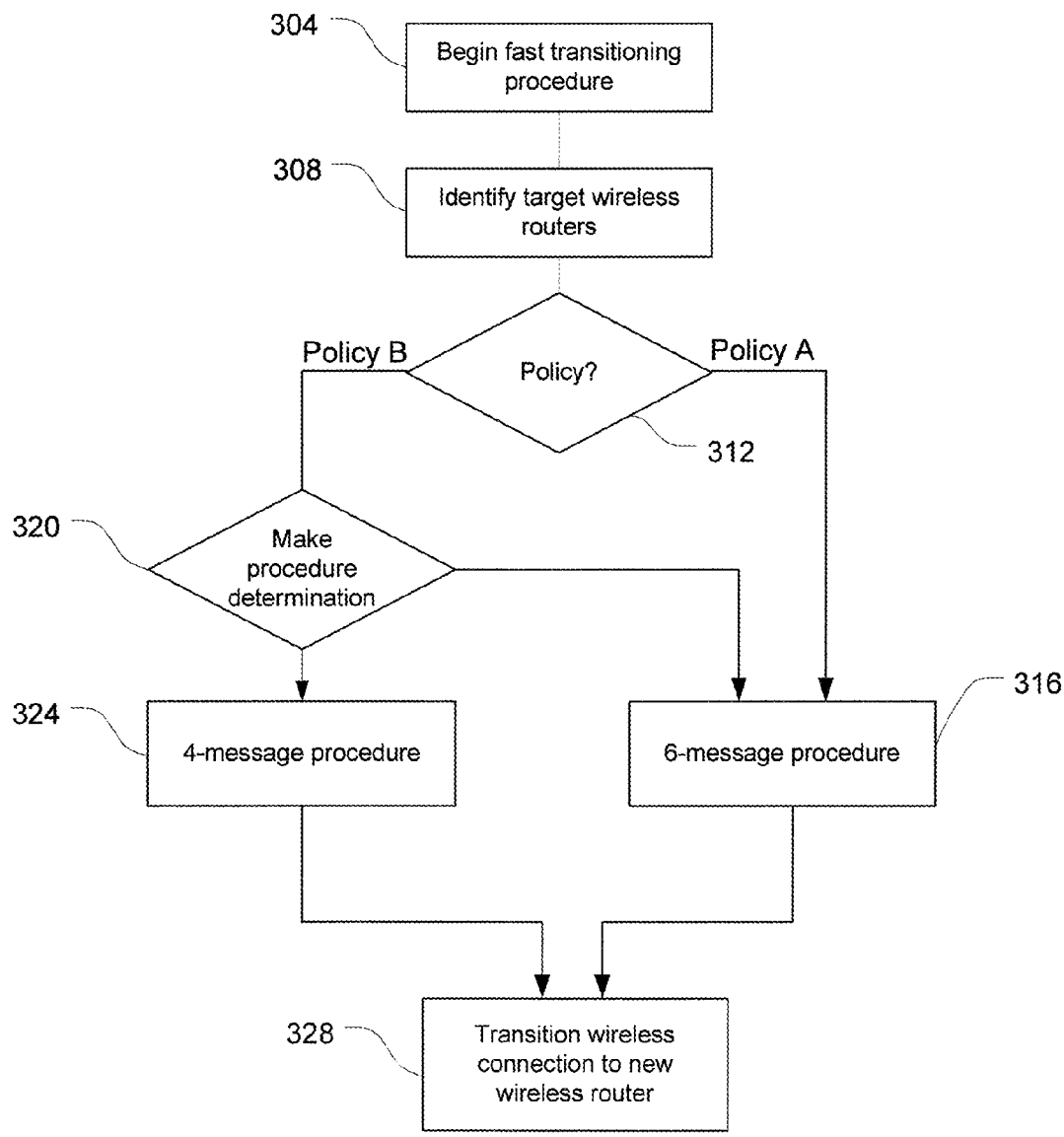
FIG. 3 illustrates a fast transition procedure in accordance with an embodiment of this invention.

In various embodiments, the QoS scheduler 160 may support varying levels of fast transitioning procedures and the transitioning manager 140 may adjust its fast transitioning operations accordingly. FIG. 3 illustrates a fast transitioning procedure in accordance with an embodiment of the present invention. In this embodiment, the station 104 may begin the fast transitioning procedure at an event such as, e.g., detection of signal deterioration in the wireless connection 112 with the wireless router 116, block 304. The station 104 may identify one or more wireless routers that are within range as target wireless routers, e.g., wireless router 124, block 308. Identification of target wireless routers may include various identification and/or authentication operations. Some of these operations may occur through the use of active scanning, passive scanning, and/or through the use of wireless neighbor reports.

Identification of target wireless routers may include the station 104 receiving policy advertisements broadcast from various wireless routers that indicate the QoS capabilities of the particular wireless routers. The policy advertisement may inform the station 104 that the wireless router 124 has an administrative policy that calls for the station 104 to execute a resource negotiation before the re-association request (Policy A); or provides the station 104 with an option of executing the QoS resource negotiation contemporaneously with the re-association request or prior to the re-association request (Policy B). These administrative policies may be communicated by, e.g., the setting of a protocol policy bit to 0 or 1. In various embodiments, other policies may be additionally/alternatively implemented.

Negotiating for QoS resources prior to the re-association request may hereinafter be referred to as a 6-message procedure, while negotiating for QoS resources contemporaneously with re-association negotiation may hereinafter be referred to as a 4-message procedure. In various embodiments, other number of messages may be used for either of these procedures.

The 6-message procedure may introduce latency into the infrastructure to provide a wireless router additional time to process QoS calculations by having them done prior to the re-association request. The 4-message procedure, on the other hand, may conserve a station's resources by providing reduced transmissions compared to the 6-message procedure.

In an embodiment, the station 104 may use the policy advertisement to make a policy determination, block 312. If the station 104 determines that the target wireless router 124 has Policy A set, it may proceed with the 6-message procedure for QoS resource and re-association negotiation, block 316. If, however, the station 104 determines that the target wireless router 124 has Policy B set, it may make a procedure determination, block 320, and decide to use the 4-message procedure, block 324, or the 6-message procedure, block 316. The flexibility provided to the station 104 through Policy B may be useful if, e.g., the station 104 decides that router processing of the TSPECs in 4-message procedure is taking too much time in which case the station 104 may wish to revert to the 6-message procedure. In another example, if the station 104 senses wireless congestion, it may wish to reserve TSPEC resources at multiple wireless routers, using the first 4 messages of the 6-message procedure with multiple wireless routers, and finally send the last 2 messages to one of those wireless routers, described in further detail below.

If the 4- or 6-message procedure is successful, the station may then transition the wireless connection 112 from the wireless router 116 to the target wireless router 124, block 328.

Figure 4:
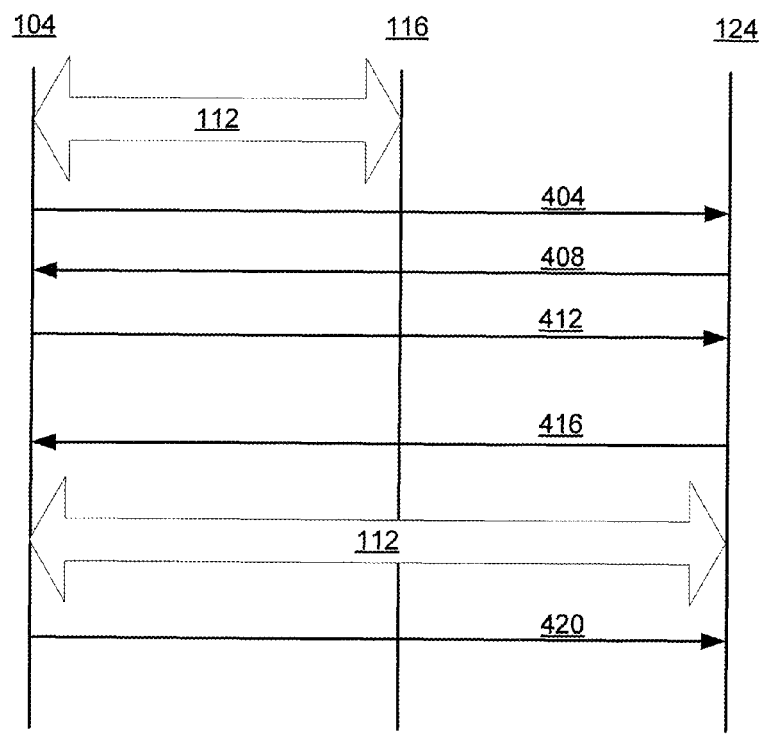
FIG. 4 illustrates a 4-message transition procedure in accordance with an embodiment of this invention.

FIG. 4 illustrates a 4-message procedure in accordance with an embodiment of the present invention. In this embodiment, the station 104 may have the wireless connection 112 with the wireless router 116. At initiation of a fast transitioning procedure, the station 104 may transmit an FT Authentication Request 404 to the wireless router 124. The FT Authentication Request 404 may include a station nonce (Snonce), e.g., a randomly (or pseudo-randomly) generated number, to protect against replay attacks. The FT Authentication Request 404 may also include a mobility domain identifier (MDID) to identify the wireless fast transitioning mobility domain. A station may execute a fast transitioning procedure to any wireless router within the same mobility domain.

The wireless router 124 may use the attributes provided in the FT Authentication Request 404 to derive a secret session key. The wireless router 124 may return an FT Authentication Response 408. The FT Authentication Response 408 may include a wireless router nonce (ANONCE), an MDID, and a fast transitioning information element (FTIE), which may contain identifiers for the network entities that are eligible to hold secret keys within the mobility domain. The station 104 may use the parameters provided in the FT Authentication Response 408 to derive the secret session key.

In various embodiments, the FT Authentication Request 404 and Response 408 may be done either over the air (e.g., directly with wireless router 124) or via the wireless connection 112 with wireless router 116; while the messages to follow may be done over the air.

After a successful authentication, the station 104 may construct and transmit a resource request contemporaneously with a Re-Association Request 412. This may be done by including the resource request in the Re-Association Request 412.

In addition to the resource request, the Re-Association Request 412 may include management fields such as one or more IEs that carry protocol specific information to assist in fast transitioning, e.g., security information, key lifetimes, MDID, FTIE, unique session identifiers, etc. The Re-Association Request 412 may also include a message integrity code (MIC) generated using a key confirmation key (KCK) to authenticate and maintain the integrity of the communications.

Figure 5:
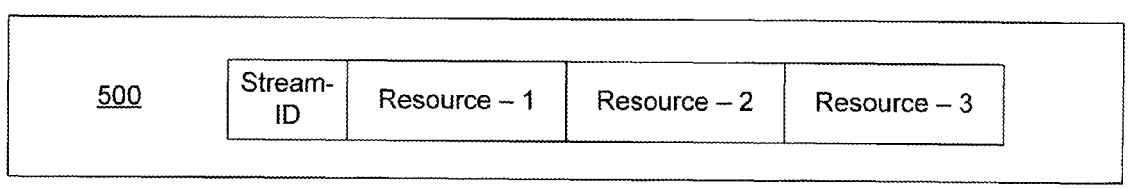
FIG. 5 illustrates a resource request in accordance with an embodiment of this invention.

FIG. 5 illustrates a resource request 500 that may be transmitted in the Re-Association Request 412. The resource request 500 may include a stream identification element (stream-ID) followed by a number of QoS resources, e.g., Resource-1, Resource-2, and Resource-3. Resources 1-3 may be QoS resource alternatives, which may be listed in the order of preference. That is, Resource-1 is the first choice of the station 104, Resource-2 is the second, and so forth.

The wireless router 124 may process the Re-Association Request 412 and determine whether any of the requested resources may be allocated to the station 104. The wireless router 124 may then generate a Re-Association Response 416 including, for example, management fields, a resource response, and MIC-KCK.

Figure 6:
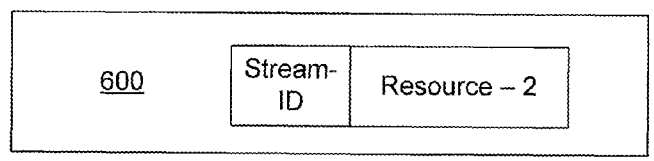
FIG. 6 illustrates a resource response in accordance with an embodiment of this invention.

In various embodiments, the resource response may indicate an allocated resource; no resource allocated but one or more alternative resources suggested; or no resource allocated or suggested. FIG. 6 illustrates a resource response 600 indicating an allocated resource in accordance with an embodiment of this invention. In particular, the resource response 600 indicates that the second requested resource, e.g., Resource-2, was allocated to the station 104. The station 104 may then re-associate the wireless connection 112 with the wireless router 124 with Resource-2.

Figure 7:
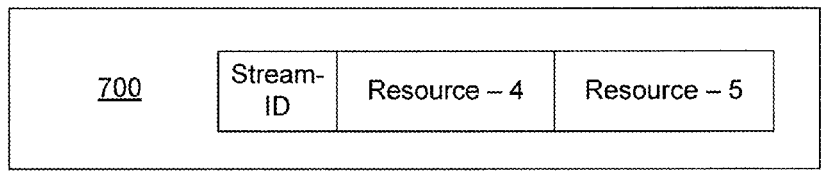
FIG. 7 illustrates a resource response in accordance with an embodiment of this invention.

As shown above, transmission of the resource requests and responses may be conducted in a secure integrity-protected session so that resources cannot be modified by an attacker. While the above embodiments discuss specific security mechanisms, other embodiments may use other mechanisms FIG. 7 illustrates a resource response 700 indicating that no resource was allocated but alternative resources are suggested in accordance with an embodiment of this invention. In particular, the resource response 700 suggests Resource-4 and Resource-5 as alternative resources. At this point, neither of these suggested resources may have been allocated. At this point, the station 104 may re-associate the wireless connection 112 with the wireless router 124 and, if desired, request allocation of one of the suggested resources through an add data traffic stream (ADDTS) message 420. At that time, the wireless router 124 may allocate one of the requested resources.

An embodiment indicating that no resources were allocated or suggested may simply include a stream ID without any resources listed.

As discussed above, the Re-Association Request 412 may not fail if none of the requested resources can be allocated. However, the Re-Association Request 412 may fail for other reasons, e.g., a badly formed message, MIC failure, keys not derived properly, etc. The station 104 may perform these other checks prior to transitioning the wireless connection 112.

Figure 8:
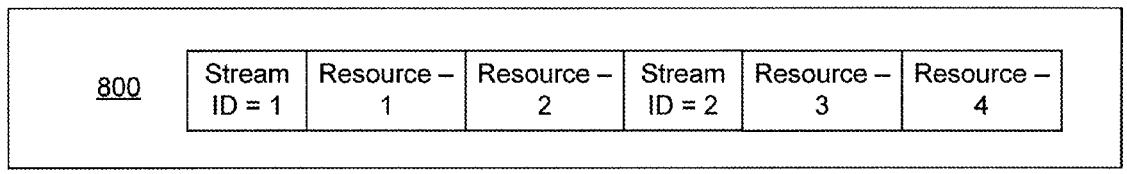
FIG. 8 illustrates a resource request for two streams in accordance with an embodiment of this invention.

While the above resource requests and responses illustrate one data stream, other embodiments may have more than one data stream (hereinafter simply stream). FIG. 8 illustrates a resource request 800 having a first stream with a stream ID=1 and a second stream with a stream ID=2. In various embodiments, the different streams may indicate a different type of network traffic. For example, stream 1 may include video, while stream 2 includes voice.

Figure 9:
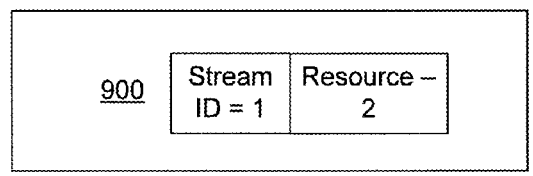
FIG. 9 illustrates a resource response in accordance with an embodiment of this invention.

In this embodiment, the resource request 800 indicates two resource options for the first stream, e.g., Resource-1 and Resource-2; and two resource options for the second stream, e.g., Resource-3 and Resource-4. In response to this request, the wireless router 124 may transmit a resource response 900 illustrated in FIG. 9, in accordance with an embodiment of this invention. The resource response 900 indicates that Resource-2 was allocated for the first stream and no resource was allocated for the second stream.

Figure 10:
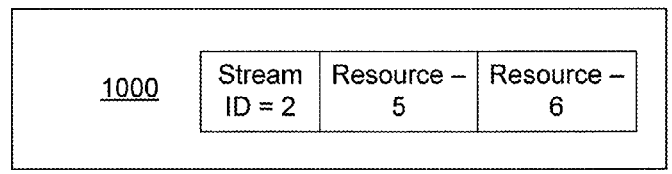
FIG. 10 illustrates a resource response in accordance with an embodiment of this invention.

FIG. 10 illustrates an alternative resource response 1000 that may be transmitted by the wireless router 124 in accordance with an embodiment of this invention. The resource response 1000 indicates that no resources were allocated or suggested for stream 1; no resources were allocated for stream 2; and Resource-5 and Resource-6 are suggested as alternatives for stream 2.

In various embodiments, the content of the responses may vary according to resource availability and the capabilities of the QoS scheduler 160 to suggest feasible alternative resources.

Figure 11:
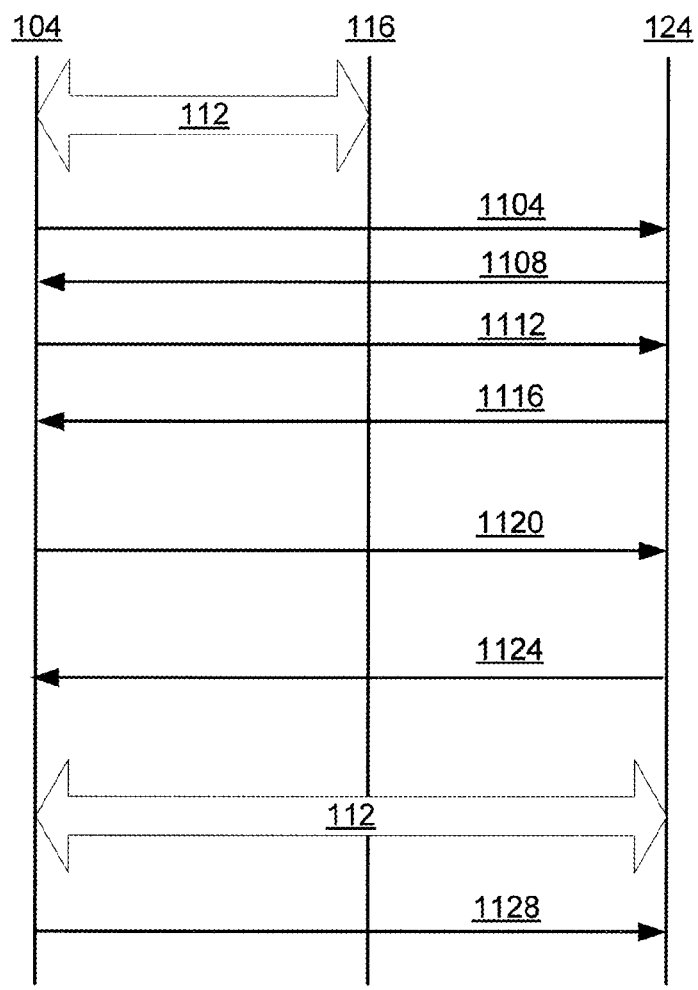
FIG. 11 illustrates a 6-message transition procedure in accordance with an embodiment of this invention.

FIG. 11 illustrates a 6-message procedure in accordance with an embodiment of the present invention. In this embodiment, the station 104 may initiate fast transitioning procedure through an FT Authentication Request 1104 and FT Authentication Response 1108, similar to like-named messages discussed in relation to the 4-message procedure. The station 104 may then transmit an FT Authentication Confirm 1112 message that includes a resource request. Similar to above embodiment, the FT Authentication Confirm 1112 will not fail if the wireless router 124 is unable to allocate any of the requested resources; however, it may fail for a badly formed message, MIC failure, keys not properly derived, etc. The wireless router 124 may return an FT Authentication Acknowledge 1116 including a resource response.

The station 104 may process the FT Authentication Acknowledge 1116 and may proceed to re-associate the wireless connection 112 with the wireless router 124, go to another wireless router, or restart the 6-message procedure with new resources with the wireless router 124.

If the station 104 proceeds to re-associate the wireless connection 112 with the wireless router 124, it may transmit a Re-Association Request 1120 to the wireless router 124 including management fields and a MIC-KCK. The Re-Association Request 1120 may not include the resource request, as this was already transmitted. The wireless router 124 may process the Re-Association Request 1120 by accessing memory to determine whether any resources were reserved for this station 104. If a resource was allocated, the wireless router 124 may proceed by associating the allocated resource with the station 104. The wireless router 124 may generate and transmit a Re-Association Response 1124 to the station 104 including management fields and an MIC-KCK.

The station 104 may process the Re-Association Response 1124 and if it is successful, may proceed to transfer the wireless connection 112 to the wireless router 124.

In an embodiment, the Re-Association Request 1120 and the Re-Association Response 1124 may be done over the air, while the previous messages may be done over the air or through the wireless connection 112 with the wireless router 116.

If necessary, the station 104 may use an ADDTS message 1128, after re-associating with wireless router 124, to request allocation of one of the alternative resources suggested in resource response transmitted in FT Authentication Acknowledge 1116.

In some embodiments, the station 104 may execute the first four messages of the 6-message procedure, e.g., the FT Authentication Request, Response, Confirm, and Acknowledge, with multiple wireless routers. This may allow the station 104 to receive an indication prior to re-association on which wireless routers can accept its resource request. The next two messages of the 6-message procedure, e.g., the Re-Association Request and Response, may then be done with a selected wireless router, e.g., wireless router 124, in order to effectuate the re-association.

Figure 12:
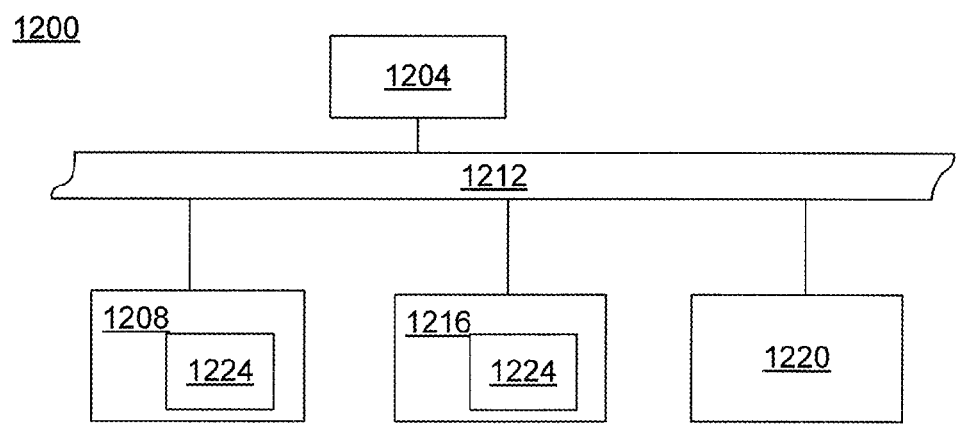
FIG. 12 illustrates a computing device in accordance with an embodiment of this invention.

FIG. 12 illustrates a computing device 1200 capable of implementing an FT platform in accordance with various embodiments. As illustrated, for the embodiments, computing device 1200 includes processor 1204, memory 1208, and bus 1212, coupled to each other as shown. Additionally, computing device 1200 includes storage 1216, and communication interfaces 1220, e.g., a WNIC, coupled to each other, and the earlier described elements as shown.

Memory 1208 and storage 1216 may include in particular, temporal and persistent copies of QoS logic 1224, respectively. The QoS logic 1224 may include instructions that when accessed by the processor 1204 result in the computing device 1200 performing operations or executions described in conjunction with the FT platforms in accordance with embodiments of this invention. In particular, the accessing of the QoS logic 1224 by the processor 1204 may facilitate transition managing and scheduling operations of the FT platforms as described above in connection with various embodiments.

In various embodiments, the memory 1208 may include RAM, dynamic RAM (DRAM), static RAM (SRAM), synchronous DRAM (SDRAM), dual-data rate RAM (DDRRAM), etc.

In various embodiments, the processor 1204 may include one or more single-core processors, multiple-core processors, controllers, application-specific integrated circuits (ASICs), etc.

In various embodiments, storage 1216 may include integrated and/or peripheral storage devices, such as, but not limited to, disks and associated drives (e.g., magnetic, optical), universal serial bus (USB) storage devices and associated ports, flash memory, read-only memory (ROM), non-volatile semiconductor devices, etc.

In various embodiments, storage 1216 may be a storage resource physically part of the computing device 1200 or it may be accessible by, but not necessarily a part of, the computing device 1200. For example, the storage 1216 may be accessed by the computing device 1200 over a network.

In various embodiments, computing device 1200 may have more or less elements, and/or different architectures. In various embodiments, computing device 1200 may be a station, an access point, or some other wireless communication device.

Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:

1. A method comprising:
    establishing, by a station, a wireless connection with a first wireless local area network (WLAN) router;
    transmitting, by the station, a resource request to a second WLAN router requesting allocation of a quality of service (QoS) resource;
    receiving, by the station, a resource response from the second WLAN router indicating a nonallocation of the QoS resource;
    transitioning, by the station, the wireless connection from the first WLAN router to the second WLAN router notwithstanding said nonallocation of the QoS resource, wherein said transitioning comprises transmitting a re-association request to the second WLAN router, and receiving a successful re-association response from the second WLAN router; and
    receiving, by the station, a policy advertisement from the second WLAN router indicating whether the station must transmit the resource request prior to transmitting the re-association request or whether the station has the option to transmit the resource request prior to transmitting the re-association request or contemporaneously with the re-association request.

2. The method of claim 1, further comprising:
    receiving, in the resource response, one or more QoS resources as suggested alternatives to the requested QoS resource.

3. The method of claim 2, further comprising:
    transmitting, subsequent to said transitioning of the wireless connection, another resource request requesting allocation of another QoS resource selected from the one or more suggested QoS resources.

4. The method of claim 1, further comprising:
    detecting a signal deterioration in the wireless connection with the wireless router; and
    transitioning the wireless connection from the first WLAN router to the second WLAN router based at least in part on said detecting of the signal deterioration.

5. The method of claim 1, wherein said transmitting of the re-association request includes said transmitting of the resource request.

6. The method of claim 1, wherein said transmitting of the resource request occurs prior to said transmitting of the re-association request.

7. The method of claim 1, further comprising:
    transmitting the resource request to a plurality of WLAN routers that includes the second WLAN router;
    receiving resource responses from the plurality of WLAN routers;
    selecting the second WLAN router from the plurality of WLAN routers based at least in part on said receiving of the resource responses; and
    transmitting the re-association request to the second WLAN router based at least in part on said selecting of the second WLAN router.

8. The method of claim 1, wherein said transmitting of the resource request requesting allocation of the QoS resource further comprises:
    identifying a plurality of QoS resources; and
    requesting allocation of at least one of the plurality of the QoS resources.

9. The method of claim 1, wherein said transmitting of the resource request and receiving of the resource response are conducted within an integrity-protected communication session.

10. A system comprising:
    an omnidirectional antenna coupled to a host and configured to provide access to a wireless local area network (WLAN), said access including a wireless connection between the host and a first WLAN router; and
    the host including a transitioning manager configured to transmit, via the omnidirectional antenna, a resource request to a second WLAN router for a quality of service (QoS) resource; to receive, via the omnidirectional antenna, a resource response from the second WLAN router indicating a nonallocation of the QoS resource; to transmit a re-association request to the second WLAN router; to transition the wireless connection from the first WLAN router to the second WLAN router notwithstanding said nonallocation of the QoS resource and based at least in part on a receipt of a successful re-association response from the second WLAN router to the re-association request; and to receive a QoS capability advertisement from the second WLAN router indicating whether the second WLAN router is capable of receiving the resource request as a part of the re-association request, and a policy advertisement from the second WLAN router indicating whether the station must transmit the resource request prior to transmitting the re-association request or whether the station has the option to transmit the resource request prior to transmitting the re-association request or contemporaneously with the re-association request.

11. The system of claim 10, wherein the resource request further indicates one or more suggested QoS resources as alternatives to the requested QoS resource.

12. The system of claim 11, wherein the transitioning manager is further configured to transmit another resource request to the second WLAN router for another QoS resource selected from the one or more suggested QoS resources.

13. The system of claim 10, wherein the transitioning manager is further configured to include the resource request in the re-association request.

14. The system of claim 10, wherein the transition manager is further configured to transmit the resource request prior to the re-association request.

15. An apparatus comprising:
    a wireless local area network (WLAN) interface card coupled to a host and configured to provide the host access to a WLAN; and
    the host including a scheduler configured to broadcast a policy advertisement indicating whether a station must transmit a resource request prior to transmitting a re-association request or whether a station has the option to transmit a resource request prior to transmitting a re-association request or contemporaneously with a re-association request; to receive, via the wireless network interface card, a resource request from a station requesting allocation of a quality of service (QoS) resource; to transmit, via the wireless network interface card, a resource response indicating a nonallocation of the QoS resource; and to form a wireless connection with the station notwithstanding said nonallocation of the QoS resource based at least in part on a receipt of a re-association request and a transmission of a successful re-association response.

16. The apparatus of claim 15, wherein the scheduler is further configured to transmit, in the resource response, one or more QoS resources as suggested alternatives to the requested QoS resource.

17. A non-transitory machine-accessible medium having associated instructions, which, when executed, results in a station:
  establishing a wireless connection with a first wireless local area network (WLAN) router;
  transmitting a resource request to a second WLAN router requesting allocation of a quality of service (QoS) resource;
  receiving a resource response from the second WLAN router indicating a nonallocation of the QoS resource;
  transitioning the wireless connection from the first WLAN router to the second WLAN router notwithstanding said nonallocation of the QoS resource, wherein said transitioning comprises transmitting a re-association request to the second WLAN router, and receiving a successful re-association response from the second WLAN router; and
  receiving a policy advertisement from the second WLAN router indicating whether the station must transmit the resource request prior to transmitting the re-association request or whether the station has the option to transmit the resource request prior to transmitting the re-association request or contemporaneously with the re-association request.

18. The machine-accessible medium of claim 17 having associated instructions, which, when executed, further results in the station:
  receiving, in the resource response, one or more suggested QoS resources as suggested alternatives to the requested QoS resource; and
  transmitting, subsequent to said transitioning of the wireless connection, another resource request requesting allocation of another QoS resource selected from the one or more suggested QoS resources.

19. The machine-accessible medium of claim 17 having associated instructions, which, when executed, further results in the station:
  determining whether to transmit the resource request prior to transmitting the re-association request or contemporaneously with the re-association request.

* * * * *

UNITED STATES PATENT AND TRADEMARK OFFICE
CERTIFICATE OF CORRECTION

| | | |
|---|---|---|
| PATENT NO. | : 7,911,997 B2 | Page 1 of 1 |
| APPLICATION NO. | : 11/462657 | |
| DATED | : March 22, 2011 | |
| INVENTOR(S) | : Sood | |

It is certified that error appears in the above-identified patent and that said Letters Patent is hereby corrected as shown below:

In the Claims

Column 12

Claim 18, Line 11, "18. The machine-accessible medium of claim 17…" should read
-- 18. The non-transitory machine-readable medium of claim 17… --.

Signed and Sealed this
Eleventh Day of February, 2014

Michelle K. Lee
*Deputy Director of the United States Patent and Trademark Office*